US012288910B1

(12) United States Patent
Gao et al.

(10) Patent No.: US 12,288,910 B1
(45) Date of Patent: Apr. 29, 2025

(54) CATALYST COATED MEMBRANE AND PREPARATION METHOD THEREOF, MEMBRANE ELECTRODE AND FUEL CELL

(71) Applicant: Wuhan Hydrogen Energy and Fuel Cell Industry Technology Research Institute Co., Ltd., Wuhan (CN)

(72) Inventors: Lingfeng Gao, Wuhan (CN); Tianshu Liao, Wuhan (CN); Jianan Wang, Wuhan (CN); Huixuan Liu, Wuhan (CN); Chen Chen, Wuhan (CN); Yuting Zou, Wuhan (CN)

(73) Assignee: Wuhan Hydrogen Energy and Fuel Cell Industry Technology Research Institute Co., Ltd., Wuhan (CN)

( * ) Notice: Subject to any disclaimer, the term of this patent is extended or adjusted under 35 U.S.C. 154(b) by 0 days.

(21) Appl. No.: 18/986,781

(22) Filed: Dec. 19, 2024

Related U.S. Application Data

(63) Continuation of application No. PCT/CN2024/136483, filed on Dec. 3, 2024.

(30) Foreign Application Priority Data

May 23, 2024 (CN) .......................... 202410642734.3

(51) Int. Cl.
  *H01M 8/1004* (2016.01)
  *H01M 4/88* (2006.01)
  *H01M 4/92* (2006.01)

(52) U.S. Cl.
  CPC ....... *H01M 8/1004* (2013.01); *H01M 4/8828* (2013.01); *H01M 4/8882* (2013.01); *H01M 4/926* (2013.01)

(58) Field of Classification Search
  CPC ............. H01M 8/1004; H01M 4/8828; H01M 4/8882; H01M 4/926; H01M 8/1081
  See application file for complete search history.

(56) References Cited

U.S. PATENT DOCUMENTS

| 5,234,777 | A | 8/1993 | Wilson |
| 2023/0282843 | A1* | 9/2023 | Coole ................. H01M 8/0276 429/480 |

FOREIGN PATENT DOCUMENTS

CN          114864971  A  *  8/2022  ........... C08G 83/008

OTHER PUBLICATIONS

CN-114864971-A—Machine Translation (Year: 2022).*
(Continued)

*Primary Examiner* — Brian R Ohara
*Assistant Examiner* — Patrick Marshall Greene
(74) *Attorney, Agent, or Firm* — Hemisphere Law, PLLC; Zhigang Ma

(57) ABSTRACT

The invention discloses a catalyst coated membrane and preparation method thereof, membrane electrode and fuel cell. The above preparation method includes: firstly, adding sodium type resin to an aqueous-alcohol dispersion of Pt/C catalyst, and stirring and dispersing to obtain a catalyst slurry; secondly, coating the catalyst slurry onto a PTFE membrane, drying at room temperature, and then transferring to an sintering box for heat treatment to obtain a catalyst coated PTFE membrane; thirdly, preparing a proton membrane with catalyst transfer layer by thermocompression transfer of the catalyst coated PTFE membrane and a proton exchange membrane; finally, protonating the proton membrane with catalyst transfer layer to obtain a catalyst coated membrane. The present invention utilizes the great thermal stability of sodium type resin to enhance the crystallization degree of Nafion-H in the catalyst coated membrane through (Continued)

heat treatment, thereby improving the resistance to free radical oxidation and corrosion.

8 Claims, 2 Drawing Sheets

(56) References Cited

OTHER PUBLICATIONS

CNIPA, Notification of a First Office Action for CN202410642734.3, Jun. 26, 2024.
Wuhan Hydrogen Energy and Fuel Cell Industry Tech Research Institute Co Ltd (Applicant), Replacement claims (allowed) of CN202410642734.3, Jul. 8, 2024.
CNIPA, Notification to grant patent right for invention in CN202410642734.3, Jul. 16, 2024.

* cited by examiner

CATALYST COATED MEMBRANE AND PREPARATION METHOD THEREOF, MEMBRANE ELECTRODE AND FUEL CELL

FIELD OF THE DISCLOSURE

The disclosure relates to a catalyst coated membrane and preparation method thereof, membrane electrode and fuel cell.

BACKGROUND

Proton exchange membrane fuel cells (PEMFCs) are energy conversion devices that can directly convert the chemical energy from hydrogen and oxidant into electrical energy through electrochemical reactions. These fuel cells are known for their high energy conversion efficiency and lack of exhaust emissions, making them one of the most promising solutions to energy crises and environmental pollution.

The membrane electrode assembly (MEA) is the core component of a fuel cell, providing the reaction place for the reactants, converting chemical energy into electrical energy, and serving as the place for multiphase material transport and electrochemical reactions. The performance and durability of the MEA directly determine the power generation efficiency and service life of the fuel cell. During the operation of the fuel cell, strong oxidizing oxygen radicals are continuously generated in the catalyst layer of the MEA. These oxygen radicals attack the Nafion-H in the catalyst layer, leading to structural damage and a decline in proton conductivity, thereby affecting the performance output and service life of the MEA. To solve this problem, strategies typically involve the introduction of anti-free radical additives such as $CeO_2$ and Pt to reduce the strong oxidizing radicals, thereby alleviating the oxidative corrosion of Nafion-H by radicals. However, the above methods all require the introduction of external additives, and these additives are prone to problems such as agglomeration and loss.

SUMMARY

The purpose of the present invention is to provide a catalyst coated membrane without any additives and preparation method thereof, membrane electrode and fuel cell, to solve the problems of complex processes and additive aggregation and loss caused by the introduction of antioxidant additives in the prior art.

The preparation method of a catalyst coated membrane includes the following steps:

S10, adding sodium type resin to an aqueous-alcohol dispersion of Pt/C catalyst, and stirring and dispersing thoroughly to obtain a catalyst slurry.

S20, coating the catalyst slurry onto a PTFE membrane, drying at room temperature, and then transferring to an inert atmosphere sintering box for heat treatment to obtain a catalyst coated PTFE membrane.

S30, preparing a proton membrane with catalyst transfer layer by thermocompression transfer of the catalyst coated PTFE membrane and a proton exchange membrane.

S40, protonating the proton membrane with catalyst transfer layer to obtain a catalyst coated membrane.

Preferably, in the step S10, the sodium type resin is a sodium-type Nafion-H solution with a mass fraction of 5 wt %-20 wt %, and the ion exchange equivalent of the sodium type resin is 700-1100 meq/g.

Preferably, in the step S20, the thickness of the PTFE membrane is 100 μm-300 μm, and the temperature resistance range of the PTFE membrane is 280° C.-320° C.

Preferably, in the step S20, the heat treatment step includes: transferring the PTFE membrane with the catalyst slurry to the inert atmosphere sintering box, introducing an inert gas to fully exclude air, heating to a set temperature, maintaining a heat treatment time, and then naturally cooling to room temperature to obtain the catalyst coated PTFE membrane.

Preferably, the inert gas is nitrogen or argon, the heat treatment temperature is 180° C.-250° C., and the heat treatment time is 20-60 min.

Preferably, in the step S30, the temperature of the thermocompression transfer is 120° C.-160° C., and the pressure of the thermocompression transfer is 1 MPa-5 MPa.

Preferably, the step S40 includes the following steps:

S401, immersing the proton membrane with catalyst transfer layer in a 0.1-1 mol/L $H_2SO_4$ solution, soaking at 50-80° C. for 20-40 min, then taking out and soaking in deionized water;

S402, drying the proton membrane with catalyst transfer layer at room temperature, and then passing through a temperature gradient drying treatment of 60-100° C. to obtain the catalyst coated membrane.

Correspondingly, the present invention also provides a catalyst coated membrane which is prepared by the preparation method of the catalyst coated membrane above.

Correspondingly, the present invention also provides a membrane electrode including the catalyst coated membrane above, a frame membrane, and a gas diffusion layer; wherein the catalyst coated membrane, the frame membrane, and the gas diffusion layer are sequentially adhered.

Correspondingly, the present invention also provides a fuel cell including the membrane electrode as described above.

The beneficial effect of the technical scheme proposed in the present invention is: the purpose of the present invention is to provide a catalyst coated membrane and preparation method thereof, membrane electrode and fuel cell. The above preparation method includes: firstly, adding sodium type resin to an aqueous-alcohol dispersion of Pt/C catalyst, and stirring and dispersing thoroughly to obtain a catalyst slurry; secondly, coating the catalyst slurry onto a PTFE membrane, drying at room temperature, and then transferring to an inert atmosphere sintering box for heat treatment to obtain a catalyst coated PTFE membrane; thirdly, preparing a proton membrane with catalyst transfer layer by thermocompression transfer of the catalyst coated PTFE membrane and a proton exchange membrane; finally, protonating the proton membrane with catalyst transfer layer to obtain a catalyst coated membrane. The present invention uses sodium type resin instead of hydrogen type resin to prepare a catalyst coated membrane. By utilizing the good thermal stability of sodium type resin, the crystallization degree of Nafion-H in the catalyst coated membrane is improved through subsequent heat treatment. The high crystallinity resin in the catalyst coated membrane can effectively enhance the resistance to free radical oxidation corrosion, which ensure the stability of three-phase reaction sites, and thus enhance the resistance to free radical corrosion and durability of membrane electrodes.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Below, the technical solutions in the embodiments of the present invention will be clearly and completely described in conjunction with the embodiments of the present invention. Obviously, the described embodiments are only a part of the embodiments of the present invention, not all of them. Based on the embodiments of the present invention, all other embodiments obtained by ordinary skilled persons in the art without creative labor are within the scope of protection of the present invention.

Figure 1:
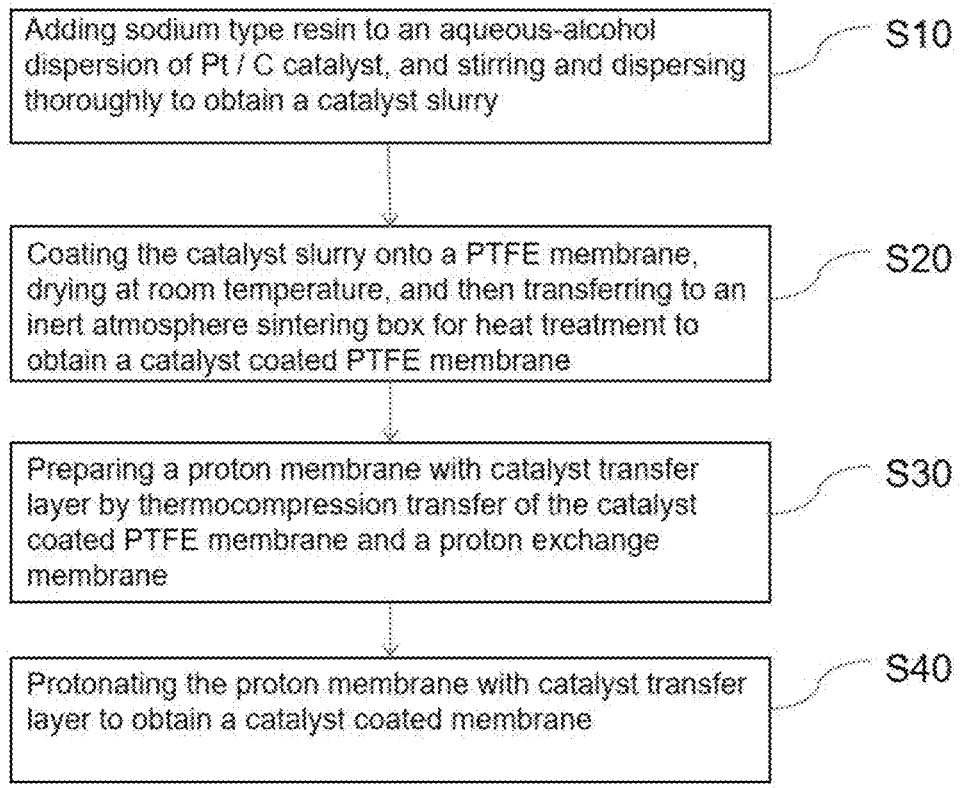
FIG. 1 is a flowchart of the preparation method of a catalyst coated membrane provided in an embodiment of the present invention.

Please refer to FIG. 1, which is a flowchart of the preparation method of a catalyst coated membrane provided in an embodiment of the present invention. The preparation method of a catalyst coated membrane includes the following steps:

S10, adding sodium type resin to an aqueous-alcohol dispersion of Pt/C catalyst, and stirring and dispersing thoroughly to obtain a catalyst slurry. Specifically, the step S10 also includes:

Firstly, provide a sodium type resin, whose full name is sodium cation exchange resin. It is a resin obtained by converting strong acid ion exchange resin and sodium chloride. It contains a large amount of sodium ions and can adsorb more adsorbed ions in water. Sodium type resin has the characteristics of stable water quality, long service life, fast exchange rate, strong ion adsorption capacity, uniform particles, and good pollution resistance.

In the present invention, the sodium type resin is a sodium-type Nafion-H solution with a mass fraction of 5 wt %-20 wt %, and the ion exchange equivalent of the sodium type resin (EW value represents the mass of the membrane required for 1 mol of cations, and the smaller the EW value, the higher the proton density inside the membrane and the better the conductivity of the membrane) is 700-1100 meq/g.

Afterwards, the sodium type resin is added to the aqueous-alcohol dispersion of Pt/C catalyst, and stirring and dispersing thoroughly to obtain a catalyst slurry.

S20, coating the catalyst slurry onto a PTFE membrane, drying at room temperature, and then transferring to an inert atmosphere sintering box for heat treatment to obtain a catalyst coated PTFE membrane.

Specifically, the step S20 also includes:

Coating the catalyst slurry onto a PTFE membrane, drying at room temperature, and then transferring to an inert atmosphere sintering box for heat treatment to obtain a catalyst coated PTFE membrane. Among them, the PTFE membrane is a microporous film produced by special processes such as pre mixing, extrusion, rolling, and biaxial stretching by using PTFE fine powder. The PTFE membrane has a fibrous microporous structure with a porosity of over 85%, 1.4 billion micropores per square centimeter, and a pore size range of 0.02 µm-15 µm.

Preferably, the thickness of the PTFE membrane is 100 µm-300 µm, and the temperature resistance range of the PTFE membrane is 280° C.-320° C.

Preferably, the inert gas is nitrogen or argon, the heat treatment temperature is 180° C.-250° C., and the heat treatment time is 20-60 min.

S30, preparing a proton membrane with catalyst transfer layer by thermocompression transfer of the catalyst coated PTFE membrane and a proton exchange membrane.

Specifically, the step S30 also includes:

Preparing a proton membrane with h catalyst transfer layer by thermocompression transfer of the catalyst coated PTFE membrane and a proton exchange membrane. The temperature of the thermocompression transfer is 120° C.-160° C., and the pressure of the thermocompression transfer is 1 MPa-5 MPa.

S40, protonating the proton membrane with catalyst transfer layer to obtain a catalyst coated membrane.

Specifically, the step S40 also includes:

Protonation treatment is carried out on the proton membrane with catalyst transfer layer to exchange sodium ions in the the proton membrane with catalyst transfer layer into hydrogen ions, thereby obtaining a catalyst coated membrane (CCM). The catalyst coated membrane is a thin film of carbon catalyst coated on the surface of a membrane, which is commonly used in electrochemical fields such as hydrogen fuel cells and chlor alkali electrolysis cells to improve the activity and stability of catalysts.

Specifically, the steps of protonation treatment of the proton membrane with catalyst transfer layer include:

S401, immersing the proton membrane with catalyst transfer layer in a 0.1-1 mol/L $H_2SO_4$ solution, soaking at 50-80° C. for 20-40 min, then taking out and soaking in deionized water;

S402, drying the proton membrane with catalyst transfer layer at room temperature, and then passing through a temperature gradient drying treatment of 60-100° C. to obtain the catalyst coated membrane.

Correspondingly, the present invention also provides a catalyst coated membrane which is prepared by the preparation method of the catalyst coated membrane above.

Correspondingly, the present invention also provides a membrane electrode including the catalyst coated membrane above, a frame membrane, and a gas diffusion layer; wherein the catalyst coated membrane, the frame membrane, and the gas diffusion layer are sequentially adhered.

Correspondingly, the present invention also provides a fuel cell including the membrane electrode as described above.

The preparation method of the catalyst coated membrane provided by the present invention introduces sodium type resin instead of hydrogen type resin for preparing the membrane electrode catalytic layer. Taking advantage of the great thermal stability of sodium type resin, the crystallization degree of Nafion-H in the catalyst coated membrane is improved by subsequent heat treatment of the catalyst slurry, which solves the problem of low resin crystallinity caused by directly using hydrogen type resin to prepare membrane electrodes in the past. As is well known, during the operation of fuel cells, strong oxidizing oxygen radicals are generated in the catalyst coated membrane. These oxygen radicals attack the side chain groups of the Nafion-H in the catalyst coated membrane, damaging the proton conducting structure. Improving the crystallinity of the resin in the catalyst coated membrane can effectively enhance its resistance to free radical oxidation and corrosion, ensuring the stability of the three-phase reaction sites in the catalyst coated membrane, thereby improving the resistance and durability of the membrane electrode to free radical corrosion. Moreover, the method provided by the present invention does not require the introduction of any other additives, and there are no issues such as additive aggregation, loss, or the influence of additives on catalyst performance. Through the improvement of the present invention, the crystallinity of Nafion-H in the catalyst coated membrane can be effectively increased, and the anti-oxidation and corrosion resistance and durability of the membrane electrode can be enhanced.

Furthermore, the explanation of the technical solution of the present invention will be provided in conjunction with specific embodiments.

Example 1

The Example 1 provides a method for preparing a catalyst coated membrane resistant to free radicals, comprising the following steps:

Step 1: adding 10 ml of sodium type Nafion-H solution to the aqueous-alcohol dispersion of Pt/C catalyst, maintaining the I/C ratio (mass ratio of ionomer to C) fixed at 0.8, and stirring and dispersing thoroughly to obtain a catalyst slurry.

Step 2, coating the catalyst slurry onto a PTFE membrane by scraping, with a coating thickness of 100 μm. After drying at room temperature, transferring to an inert atmosphere sintering box, introducing inert gas to completely eliminate the air, heating and raising the temperature to 230° C., maintaining for 60 min, and then naturally cooling down to room temperature to obtain the heat-treated catalyst coated PTFE membrane.

Step 3: preparing a proton membrane with catalyst transfer layer by thermocompression transfer of the catalyst coated PTFE membrane and a proton exchange membrane. The temperature for thermocompression transfer is 150° C., the transfer pressure is 2 MPa, and the transfer time is 3 minutes; The proton membrane with catalyst transfer layer obtained after thermocompression transfer is immersed in 0.5 mol/L $H_2SO_4$ and taken out after soaking at 60° C. for 30 min, followed by soaking in deionized water; Afterwards, the proton membrane with catalyst transfer layer is air dried at room temperature, and then subjected to a gradient heating and drying treatment at 60-100° C. to obtain the catalyst coated membrane.

Furthermore, the protonated catalyst coated membrane was further sealed with a frame and coated with carbon paper to obtain an anti free radical membrane electrode.

Example 2

The Example 2 provides a method for preparing a catalyst coated membrane resistant to free radicals, comprising the following steps:

Step 1: adding 10 ml of sodium type Nafion-H solution to the aqueous-alcohol dispersion of Pt/C catalyst, maintaining the I/C ratio (mass ratio of ionomer to C) fixed at 0.8, and stirring and dispersing thoroughly to obtain a catalyst slurry.

Step 2, coating the catalyst slurry onto a PTFE membrane by scraping, with a coating thickness of 100 μm. After drying at room temperature, transferring to an inert atmosphere sintering box, introducing inert gas to completely eliminate the air, heating and raising the temperature to 180° C., maintaining for 60 min, and then naturally cooling down to room temperature to obtain the heat-treated catalyst coated PTFE membrane.

Step 3: preparing a proton membrane with catalyst transfer layer by thermocompression transfer of the catalyst coated PTFE membrane and a proton exchange membrane. The temperature for thermocompression transfer is 150° C., the transfer pressure is 2 MPa, and the transfer time is 3 minutes; The proton membrane with catalyst transfer layer obtained after thermocompression transfer is immersed in 0.5 mol/L $H_2SO_4$ and taken out after soaking at 60° C. for 30 min, followed by soaking in deionized water; Afterwards, the proton membrane with catalyst transfer layer is air dried at room temperature, and then subjected to a gradient heating and drying treatment at 60-100° C. to obtain the catalyst coated membrane.

Furthermore, the protonated catalyst coated membrane was further sealed with a frame and coated with carbon paper to obtain an anti free radical membrane electrode.

Example 3

The Example 3 provides a method for preparing a catalyst coated membrane resistant to free radicals, comprising the following steps:

Step 1: adding 10 mL of sodium type Nafion-H solution to the aqueous-alcohol dispersion of Pt/C catalyst, maintaining the I/C ratio (mass ratio of ionomer to C) fixed at 0.8, and stirring and dispersing thoroughly to obtain a catalyst slurry.

Step 2, coating the catalyst slurry onto a PTFE membrane by scraping, with a coating thickness of 100 μm. After drying at room temperature, transferring to an inert atmosphere sintering box, introducing inert gas to completely eliminate the air, heating and raising the temperature to 250° C., maintaining for 60 min, and then naturally cooling down to room temperature to obtain the heat-treated catalyst coated PTFE membrane.

Step 3: preparing a proton membrane with catalyst transfer layer by thermocompression transfer of the catalyst coated PTFE membrane and a proton exchange membrane. The temperature for thermocompression transfer is 150° C., the transfer pressure is 2 MPa, and the transfer time is 3 minutes; The proton membrane with catalyst transfer layer obtained after thermocompression transfer is immersed in 0.5 mol/L $H_2SO_4$ and taken out after soaking at 60° C. for 30 min, followed by soaking in deionized water; Afterwards, the proton membrane with catalyst transfer layer is air dried at room temperature, and then subjected to a gradient heating and drying treatment at 60-100° C. to obtain the catalyst coated membrane.

Furthermore, the protonated catalyst coated membrane was further sealed with a frame and coated with carbon paper to obtain an anti free radical membrane electrode.

Comparative Example 1

The Comparative Example provides a method for preparing a catalyst coated membrane resistant to free radicals, comprising the following steps:

Step 1: adding 10 mL of hydrogen type Nafion-H solution to the aqueous-alcohol dispersion of Pt/C catalyst, maintaining the I/C ratio fixed at 0.8, and stirring and dispersing thoroughly to obtain a catalyst slurry.

Step 2, coating the catalyst slurry onto a PTFE membrane by scraping, with a coating thickness of 100 μm. After drying at room temperature, the catalyst coated PTFE membrane is obtained.

Step 3: Preparing a CCM (Catalyst Coated Membrane) by thermocompression transfer of a catalyst coated PTFE membrane and a proton exchange membrane that have been dried at room temperature. The temperature for thermocompression transfer is 150° C., the transfer pressure is 2 MPa, and the transfer time is 3 minutes.

Furthermore, the CCM was further sealed with a frame and coated with carbon paper to obtain an anti free radical membrane electrode.

Figure 2:
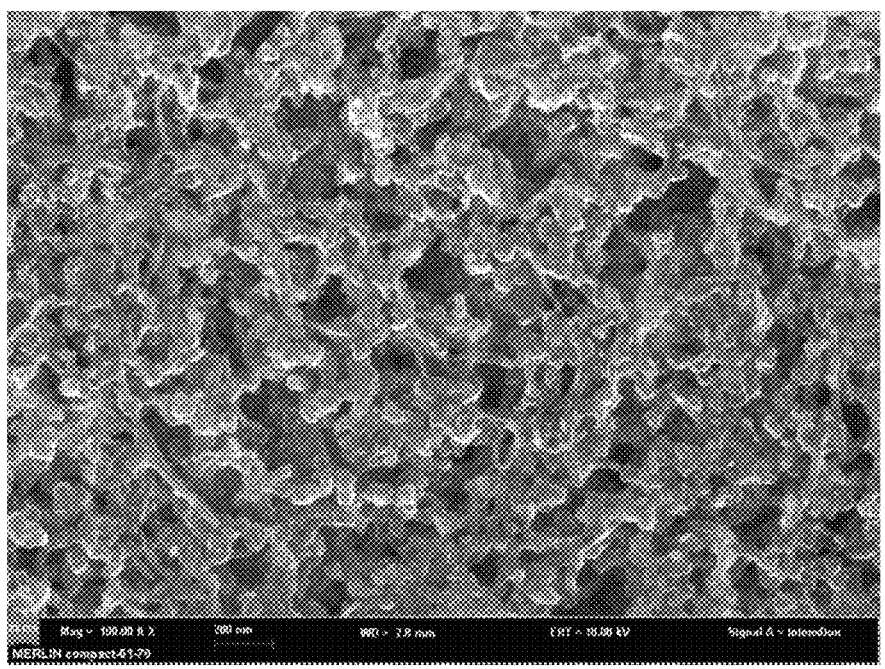
FIG. 2 is a SEM image of the surface microstructure of the catalyst coated membrane prepared in Example 1 of the present invention.
Figure 3:
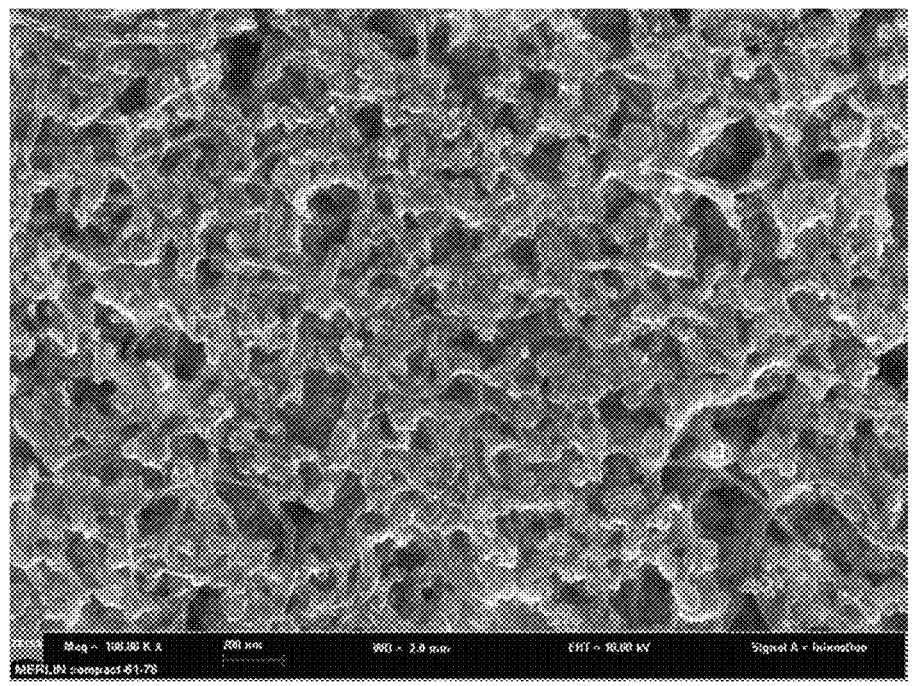
FIG. 3 is a SEM image of the surface microstructure of the conventional catalyst coated membrane prepared in Comparative Example 1 of the present invention.

Please refer to FIG. 2 and FIG. 3. FIG. 2 is a SEM image of the surface microstructure of the catalyst coated membrane prepared in Example 1 of the present invention, and FIG. 3 is a SEM image of the surface microstructure of the conventional catalyst coated membrane prepared in Comparative Example 1 of the present invention; Comparing FIG. 2 with FIG. 3, it can be seen that the two of their catalyst coated membrane structures are similar. The catalyst particles and resin form cluster structures, and the gaps between clusters form the pore structure of the catalyst coated membrane. This indicates that the heat treatment of the catalyst coated PTFE membrane in Example 1 and the subsequent protonation treatment of the proton membrane with catalyst transfer layer did not affect the structure of the catalyst coated membrane.

Figure 4:
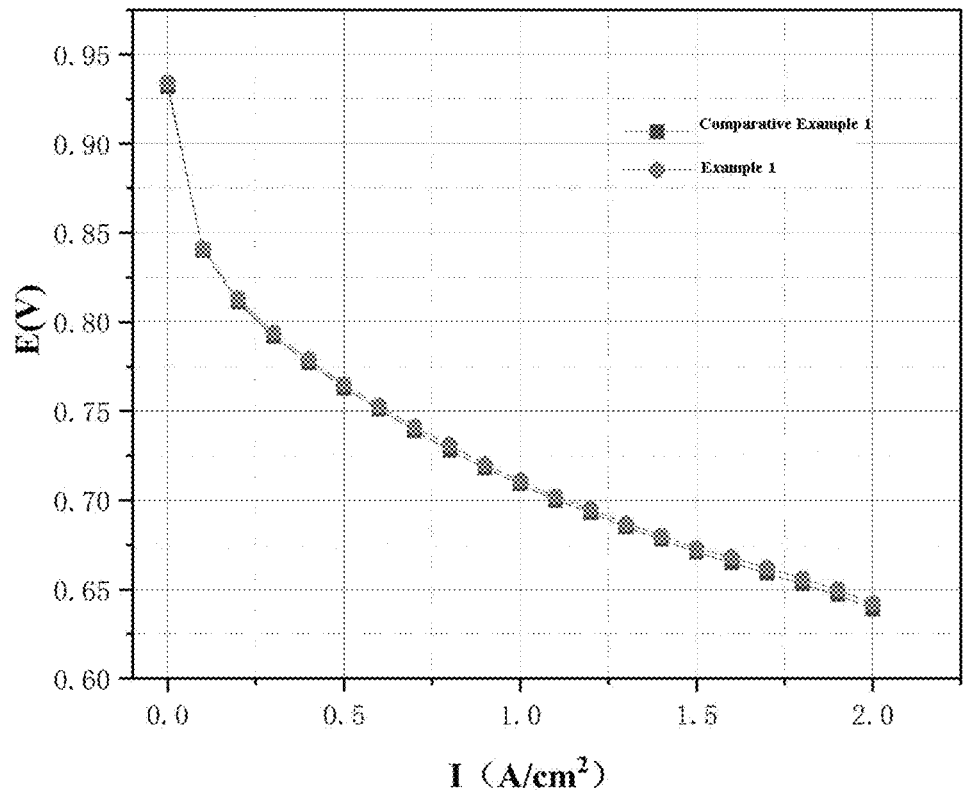
FIG. 4 is a schematic diagram of the comparison results of I-V curve tests between Example 1 and Comparative Example 1.

Furthermore, please refer to FIG. 4, which is a schematic diagram of the comparison results of I-V curve tests between Example 1 of the present invention and Comparative Example 1. From the I-V curve test results of Example 1 and Comparative Example 1 in FIG. 4, it can be seen that the performance curves of the membrane electrode obtained by the two preparation methods almost overlap, indicating that the heat treatment of the catalyst coated PTFE membrane in Example 1 and the subsequent protonation treatment of the proton membrane with catalyst transfer layer not only did not change the microstructure of the catalyst coated membrane on the membrane electrode, but also did not affect the performance of the membrane electrode.

When characterizing the anti free radical performance of membrane electrodes, open circuit voltage testing (OCV) is usually used for accelerated verification, because a large amount of oxygen free radicals are generated in the open circuit state, which has the fastest oxidation and corrosion rate on the catalytic layer resin.

Please refer to Table 1, which compares the performance, electrochemical active area, and other key performance parameters representing the catalytic layer state of the membrane electrodes prepared in Example 1 and Comparative Example 1 before and after OCV testing.

TABLE 1

| | Electrochemical Testing (V) | | | Electrochemical |
| --- | --- | --- | --- | --- |
| | OC | 0.5 A/cm² | 1.0 A/cm² | Active Area (m²/g) |
| Example 1 Membrane Electrode | 0.934 | 0.765 | 0.711 | 42 |
| Example 1 Membrane Electrode After 300 h of OCV Testing | 0.92 | 0.742 | 0.687 | 37 |
| Comparative Example 1 Membrane Electrode | 0.932 | 0.763 | 0.709 | 43 |
| Comparative Example 1 Membrane Electrode After 300 h of OCV Testing | 0.895 | 0.717 | 0.662 | 31 |

Specifically, from Table 1, it can be seen that the initial performance and electrochemical active area of the membrane electrode (Example 1) with improved crystallinity of the catalytic layer resin after heat treatment are similar to those of the membrane electrode in the comparative example, proving that the treatment method in the example did not have any adverse effects on the performance of the membrane electrode. After 300 hours of open circuit voltage accelerated corrosion testing, it can be seen that the performance and electrochemical active area of the membrane electrodes in Example 1 and Comparative Example 1 have decreased to varying degrees. This is because the oxygen free radicals generated in the open circuit state will attack the side chain groups of the Nation-H in the catalytic layer, and even damage the main chain structure. The destruction of the side chain groups will affect the proton conduction efficiency of the catalytic layer, reduce the number of reaction sites, and lead to a decline in catalytic performance. The destruction of the main chain structure can even cause catalyst loss and damage to the catalytic layer structure. However, from the specific data, it can be seen that the electrochemical performance degradation and electrochemical active area degradation of the membrane electrode in Example 1 at various current densities were significantly lower than those in Comparative Example 1. This indicates that by introducing sodium type resin and combining it with heat treatment technology to enhance the crystallinity of the catalytic layer resin, and the anti free radical oxidation corrosion ability of the membrane electrode has been significantly improved. The higher crystallinity of the resin can effectively slow down the corrosion rate of the side chains and main chains of the catalytic layer resin by oxygen free radicals in an open circuit state, thereby maximizing the protection of the three-phase reaction sites of the catalytic layer and catalyst cluster structure.

The above results indicate that by introducing sodium type Nafion-H into the catalyst slurry, utilizing the high temperature resistance characteristics of sodium type Nafion-H and its structural features of increased crystallinity during high temperature heat treatment, the problems of low crystallinity and poor oxidation and corrosion resistance of hydrogen type resin in the previous catalytic layer have been effectively improved. Through the implementation of the present invention, a membrane electrode with resistance to oxidative corrosion caused by oxygen free radicals was prepared without additional antioxidant additives and without affecting the pore structure of the catalytic layer and the performance of the membrane electrode. This method can effectively slow down the corrosion of the catalytic layer by oxygen free radicals during fuel cell operation and improve the durability of the membrane electrode.

From the above, the present invention provides a catalyst coated membrane and preparation method thereof, membrane electrode and fuel cell. The above preparation method includes: firstly, adding sodium type resin to an aqueous-alcohol dispersion of Pt/C catalyst, and stirring and dispersing thoroughly to obtain a catalyst slurry; secondly, coating the catalyst slurry onto a PTFE membrane, drying at room temperature, and then transferring to an inert atmosphere sintering box for heat treatment to obtain a catalyst coated PTFE membrane; thirdly, preparing a proton membrane with catalyst transfer layer by thermocompression transfer of the catalyst coated PTFE membrane and a proton exchange membrane; finally, protonating the proton membrane with catalyst transfer layer to obtain a catalyst coated membrane. The present invention uses sodium type resin instead of hydrogen type resin to prepare a catalyst coated membrane. By utilizing the good thermal stability of sodium type resin, the crystallization degree of perfluorosulfonic acid resin in the catalyst coated membrane is improved through subsequent heat treatment. The high crystallinity resin in the catalyst coated membrane can effectively enhance the resistance to free radical oxidation corrosion, which ensure the stability of three-phase reaction sites, and thus enhance the resistance to free radical corrosion and durability of membrane electrodes.

It should be noted that the above embodiments all belong to the same inventive concept, and the descriptions of each embodiment have their own emphasis. For some embodiments that are not described in detail, reference can be made to the descriptions in other embodiments.

The above embodiments only express the embodiments of the present invention, and their descriptions are more specific and detailed, but should not be understood as limiting the scope of the invention patent. It should be pointed out that for ordinary technical personnel in this field, several modifications and improvements can be made without departing from the inventive concept, which are within the scope of protection of the present invention. Therefore, the scope of protection of the present invention patent should be based on the appended claims.

What is claimed is:

1. A preparation method of a catalyst coated membrane, including the following steps:
    S10, adding sodium type resin to an aqueous-alcohol dispersion of Pt/C catalyst, and stirring and dispersing thoroughly to obtain a catalyst slurry;
    S20, coating the catalyst slurry onto a PTFE membrane, drying at room temperature, and then transferring to an inert atmosphere sintering box for heat treatment to obtain a catalyst coated PTFE membrane;
    S30, preparing a proton membrane with catalyst transfer layer by thermocompression transfer of the catalyst coated PTFE membrane and a proton exchange membrane;
    S40, protonating the proton membrane with catalyst transfer layer to obtain a catalyst coated membrane;
    in the step S20, the heat treatment step includes: transferring the PTFE membrane with the catalyst slurry to the inert atmosphere sintering box, introducing an inert gas to fully exclude air, heating to a set temperature, maintaining a heat treatment time, and then naturally cooling to room temperature to obtain the catalyst coated PTFE membrane; the inert gas is nitrogen or argon, the heat treatment temperature is 180° C.-250° C., and the heat treatment time is 20-60 min.

2. The preparation method of the catalyst coated membrane according to claim 1, in the step S10, the sodium type resin is a sodium-type Nafion-H solution with a mass fraction of 5 wt %-20 wt %, and the ion exchange equivalent of the sodium type resin is 700-1100 meq/g.

3. The preparation method of the catalyst coated membrane according to claim 1, in the step S20, the thickness of the PTFE membrane is 100 μm-300 μm, and the temperature resistance range of the PTFE membrane is 280° C.-320° C.

4. The preparation method of the catalyst coated membrane according to claim 1, in the step S30, the temperature of the thermocompression transfer is 120° C.-160° C., and the pressure of the thermocompression transfer is 1 MPa-5 MPa.

5. The preparation method of the catalyst coated membrane according to claim 1, wherein the step S40 includes the following steps:
    S401, immersing the proton membrane with catalyst transfer layer in a 0.1-1 mol/L $H_2SO_4$ solution, soaking at 50-80° C. for 20-40 min, then taking out and soaking in deionized water;
    S402, drying the proton membrane with catalyst transfer layer at room temperature, and then passing through a temperature gradient drying treatment of 60-100° C. to obtain the catalyst coated membrane.

6. A catalyst coated membrane, wherein the catalyst coated membrane is prepared by the preparation method of the catalyst coated membrane according to claim 1.

7. A membrane electrode, including the catalyst coated membrane as claimed in claim 6, a frame membrane, and a gas diffusion layer; wherein the catalyst coated membrane, the frame membrane, and the gas diffusion layer are sequentially adhered.

8. A fuel cell, including the membrane electrode as claimed in claim 7.

* * * * *